United States Patent [19]
Matzinger

[11] 3,827,213
[45] Aug. 6, 1974

[54] APPARATUS FOR PACKAGING SYNTHETIC-RESIN SCRAPS

[75] Inventor: August Matzinger, Flums, Switzerland

[73] Assignee: Maschinenfabrik Flums AG, Flums, Switzerland

[22] Filed: Dec. 26, 1972

[21] Appl. No.: 318,162

[30] Foreign Application Priority Data
Dec. 27, 1971   Sweden............................. 19009/71
Oct. 31, 1972   Sweden............................. 15834/72

[52] U.S. Cl.................... 53/124 E, 53/127, 53/372, 100/38, 100/93 P
[51] Int. Cl........................................... B65b 63/08
[58] Field of Search............ 53/24, 25, 21 R, 124 E, 53/124 B, 127, 372; 100/38, 93 P; 425/383

[56] References Cited
UNITED STATES PATENTS

| | | |
|---|---|---|
| 2,386,775 | 10/1945 | Balzarini............................ 53/28 X |
| 3,191,356 | 6/1965 | Zelnick et al..................... 53/372 X |
| 3,263,278 | 8/1966 | Hendry........................... 100/93 P X |
| 3,340,678 | 9/1967 | Rhodes................................. 53/372 |
| 3,384,007 | 5/1968 | Boje et al....................... 53/124 B X |
| 3,547,577 | 12/1970 | Lovercheck.................. 53/124 E X |

Primary Examiner—Travis S. McGehee
Attorney, Agent, or Firm—Karl F. Ross; Herbert Dubno

[57] ABSTRACT

The synthetic-resin scraps produced by a packaging apparatus are fed into a compressing chamber having a funnel-shaped outlet end whose walls are heated to a temperature sufficient to fuse together those scraps coming into contact with this end. A ram reciprocal in this chamber is advanced toward this end when the input feed is stopped to compress a charge of the scraps against the outlet end, thereby forming a continuous sausage-like strand having an outer skin formed directly from the scraps and enclosing a compacted mass of the scraps.

4 Claims, 8 Drawing Figures

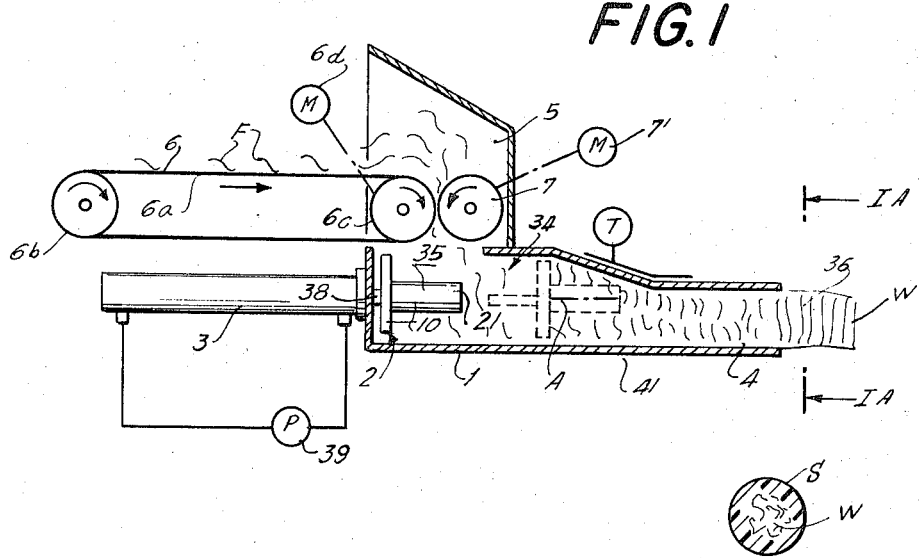
FIG.1
FIG.1A
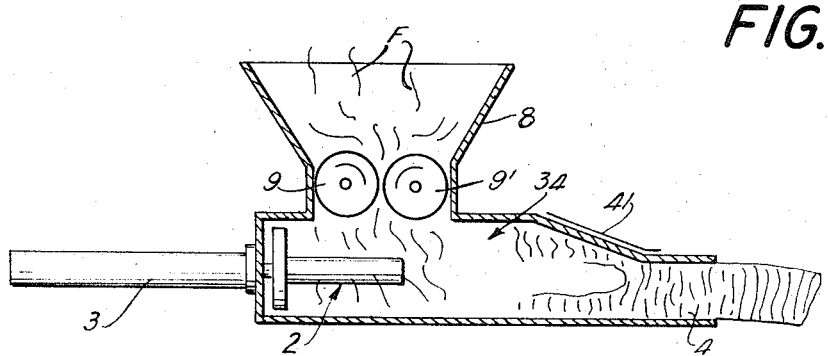
FIG.2
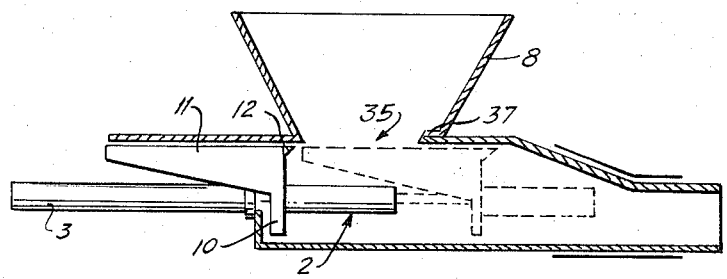
FIG.3

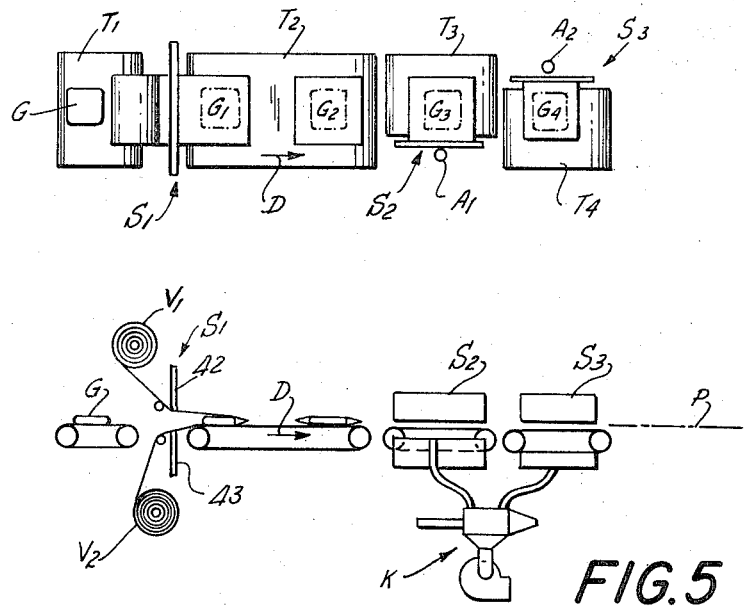
FIG. 4
FIG. 5A
FIG. 5
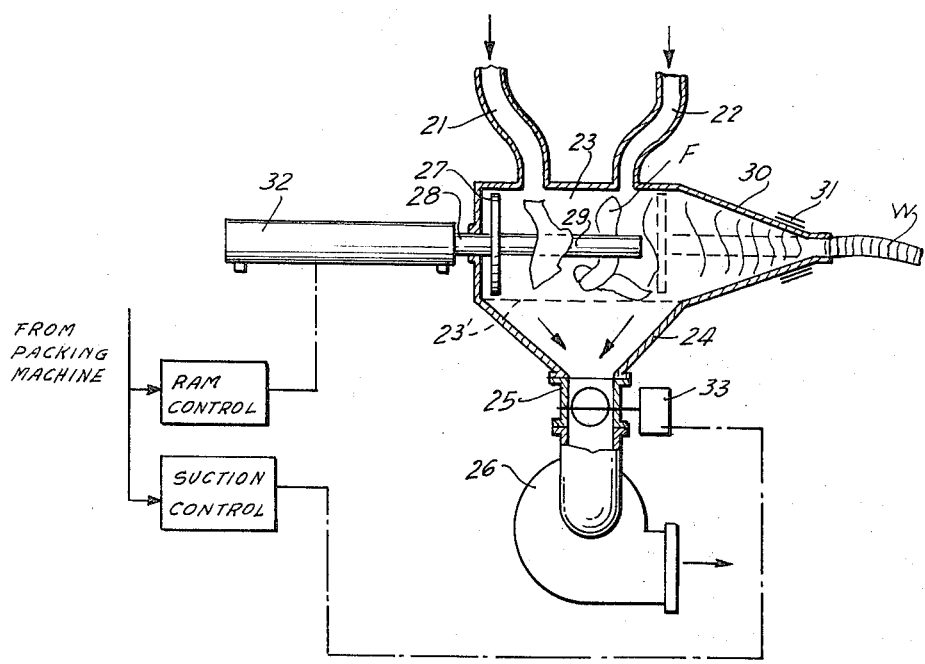
FIG. 6

APPARATUS FOR PACKAGING SYNTHETIC-RESIN SCRAPS

FIELD OF THE INVENTION

The present invention relates to an apparatus for compacting shreds or scraps of synthetic-resin foil. More particularly this invention concerns a system usable with a packaging installation for collecting and compacting the scraps of thermoplastic synthetic-resin material produced thereby.

BACKGROUND OF THE INVENTION

An extremely popular packaging method, which has gained great acceptance in recent years, is that in which the item to be packed is completely enclosed by a clear synthetic-resin envelope. This envelope is formed by inserting the item between two sheets and then forming a weld all around it. Obviously for a neat appearance, all of the synthetic-resin foil must be cut off outwardly from the welds. These cut-off scraps present a considerable difficulty since they are light and extremely bothersome to collect. As a general rule they are collected in bins on each side of the machine, these bins being simply emptied into large bags so that the scraps can be recycled or disposed of.

Such a method is far from satisfactory. The scraps so packaged are extremely bulky and can hardly be economically shipped back to the foil producer. In addition some of the scraps often escape the device and end up causing substantial difficulty by coming to rest in the delicate mechanism of the packing apparatus.

OBJECTS OF THE INVENTION

It is therefore an object of the present invention to provide an improved method of and apparatus for collecting and compacting synthetic-resin scraps.

Another object is the provision of an improved packaging system of the above-described general type.

SUMMARY OF THE INVENTION

These objects are attained according to the present invention in a system wherein the scraps are compressed in a compacting chamber having a funnel-shaped outlet whose walls are heated to soften the scraps. In this manner the bulk of the scraps can be greatly reduced.

According to a feature of this invention the walls of the tapered outlet are heated to a temperature sufficient to fuse the scraps in contact with these walls so that, as the thus externally fused, internally softened strand is extruded by the compactor and cools, it forms a unitary neat mass which can easily be recycled. The product is a continuous sausage-like strand having a casing or sheath formed directly from the scrap at the outside of the mass by thermal fusion without melting and enclosing the inner unfused but compacted scrap.

According to another feature of the invention a packaging apparatus having weld-trimming devices is provided at each such device with an arrangement that aspirates the cut-off scraps and feeds them to a compacting chamber as described above.

In accordance with yet another feature of this invention the compacting apparatus has a feed device at its input which is automatically shut down when the ram is advanced to compress a charge in the compacting chamber. This ram, according to the invention, comprises a shield-like disk reciprocal in the compacting chamber and provided with a forwardly projecting plunger that, in the advanced position of the ram, extends well into the outlet funnel.

DESCRIPTION OF THE DRAWING

The above and other objects, features, and advantages of the invention will become apparent from the following description, reference being made to the accompanying drawing in which:

FIG. 1 is a side sectional view through a first embodiment of the compacting apparatus according to the present invention;

FIG. 1A is a section along line IA—IA of FIG. 1;

FIGS. 2 and 3 are views similar to FIG. 1 through second and third embodiments of the present invention, respectively;

FIGS. 4 and 5 are respective top and side views of a packaging apparatus using the compactor according to this invention;

FIG. 5A is a detail of FIG. 5, in enlarged scale; and

FIG. 6 is a vertical section through a detail of FIG. 5, in enlarged scale.

Specific Description

As seen in FIG. 1 the compacting apparatus according to my present invention has a housing 1 forming a chamber 34 having an inlet 35 and an outlet 36. Scraps F of polyethylene foil are fed into the housing 1 above the inlet 35 by an input apparatus 6 comprising a horizontal transport belt 6a spanned between two rolls 6b and 6c driven by an electric motor 6d. A roll 7 osculates with the roll 6c through the belt 6a and is in turn driven by a motor 7' which is connected in parallel with the motor 6d so that the two operate together.

Reciprocable in the chamber 34 along an axis A is a ram 2 comprising a circular disk 10 centered on and orthogonal to the axis A and mounted on the piston rod 38 of a hydraulic cylinder 3 powered by a pump 39. Projecting axially from the disk 10 is a cylindrical plunger 21.

The outlet 36 of chamber 34 is formed as an eccentric funnel 4 tapering away from the ram 2 and provided with a heater 41 which maintains its walls at a temperature slightly above the melting point of polyethylene, here about 105°C. The temperature of the heater is controlled by the thermostat T as shown to prevent flowing of the synthetic-resin material but permitting fusion of the peripheral scrap only into a coherent sheath.

The device operates as follows: The chamber 34 is loosely loaded with scraps F by operation of the motors 6d and 7' until the desired quantity is present therein. At this moment these two motors are stopped and the pump 39 is actuated to move the ram 2 from the solid-line position to the dashed-line position, thereby compressing the mass of scraps in the funnel 4. The heat from the walls of the funnel 41 serves to melt those scraps coming into contact with these walls, while softening the other scraps. In this manner a continuous sausage-like body or strand W is extruded by the machine having, as shown in FIG. 1A, a continuous outer skin or sheath S which contains a mass of compacted scraps which are easily recycled. Of course, all of the embodiments described below may be fitted with similar thermostats for the purposes described.

As shown in FIG. 2 the input arrangement 6 can be replaced by two counterrotated rollers 9 and 9' extending parallel to each other in the base of an upwardly open hopper 8. The rollers 9 and 9' are formed with complementary cutting and crimping blades 40 which chop up the incoming scraps F. The drives for these rollers 9 and 9' are arranged to stop when the ram 2 is advanced also, as described above. In the foregoing or following, the ram may be reciprocated by a rack and pinion.

In FIG. 3 the means for cutting off the input is a shroud 11 which is carried on the disk 10 and which when the ram is advanced, as shown in dashed lines, blocks the inlet opening 35. In addition the front edge of the shroud 11 is provided with a cutting blade 12 and the facing edge of the opening 35 has a similar blade 13, so that any scraps projecting through this opening 35 when the ram is advanced are cut off. The blade 13 is heated by a resistance wire 37 for best cutting action. In this embodiment a simple hopper 8 as in FIG. 2 serves to hold the incoming scraps.

FIGS. 4 and 5 show an apparatus for packaging goods G fed to a first station by a first transport belt $T_1$. A pair of supplies $V_1$ and $V_2$ of thermoplastic film arranged above and below the transport plane P feed respective films between a pair of vertically reciprocal welding elements 42 and 43 at the station $S_1$.

Assuming the ends of the two foils from rolls $V_1$ and $V_2$ to be welded together as shown the goods are passed to a second transport band $T_2$ after which the elements 42 and 43 close behind them. The upper element 42 is downwardly concave and the lower element is formed with a central cutting edge 45 while both have resistive heating elements 44, so that at station $S_1$ two welds flanking a cut are formed when these two elements 42 and 43 are brought together. The so partially packaged goods $G_1$ are then fed to a third transport band $T_3$ where at a station $S_2$ a similar pair of elements seal one side, cutting off one edge, and then to a band $T_4$ where at another station $S_3$ the other longitudinal edge, relative to the direction of transport D, is cut off the goods $G_3$ to form a fully closed package $G_4$. Adjacent the station $S_2$ is an aspirator $A_1$ to collect the cut-off scraps of the thermoplastic film, and adjacent the station $S_3$ is a similar aspirator $A_2$, both connected to an apparatus K for compacting these scraps.

As shown in FIG. 6 this apparatus K comprises a housing 23 provided with two inlet conduits 27 and 22 opening at the aspirators $A_1$ and $A_2$, respectively. A disk 27 and plunger 29 as described above are carried on the piston rod 28 of a pneumatic cylinder 32.

The housing 23 is formed with an output funnel 30 here in line with the plunger 29, and with a perforated wall 23' which is connected via a hood 24 to the axial input of a squirrel-cage blower 26. A flap 25 operated by a servo 33 is provided between the hood 24 and the blower 26 to allow the blower 26 to draw in air through the two inlets 21 and 22 and through the wall 23' in the illustrated position or to prevent such air flow in the other position.

The welders and cutters at stations $S_2$ and $S_3$ operate at the same time, at which time the motor 33 turns the flap 25 to allow the scraps cut off the edge of the goods $G_2$ and $G_3$ to be drawn in by the aspirators $A_1$ and $A_2$.

When the chamber in the housing 23 is sufficiently filled the cylinder 32 is actuated to compress the scraps F in the funnel 30 where the heater 31 melts them partially and forms a tube W as described above. During the period that the plunger 29 and disk 27 are advanced from the illustrated position, the flap 25 is held closed to prevent any scraps from falling behind these elements. A control system including a ram controller and a suction controller operated from the circuitry of the packaging machine are provided as illustrated to permit the suction means to operate only in the cadence of the sealing and cutting means while the ram operates only in intervals between operations of the suction means.

In this manner the scraps produced by a packaging plant are automatically collected and compacted into a continuous reasonably dense strand that can be easily returned to the producer of the film for recycling. The extreme simplicity of the device makes for a long service life, and its automatic operation frees the hands of the machine operator for other tasks.

I claim:

1. An apparatus comprising:
   a foil packaging machine having means for sealing an article in in thermoplastic synthetic resin foil and means for severing scraps of foil from the resulting package;
   a compacting chamber having an inlet juxtaposed with said machine and an outlet;
   a collecting funnel at said outlet tapered away from said chamber and having a discharge port remote therefrom;
   a ram reciprocal in said chamber and in said funnel toward and away from said port;
   suction means effective at said inlet for drawing said scraps of thermoplastic synthetic-resin material into said chamber;
   drive means for reciprocating said ram and thereby compacting said scraps;
   means for heating said funnel and thereby softening the scraps of synthetic-resin material compacted therein by said ram whereby the material is extruded through said port into a continuous sausage - like strand having at least a thermally fused periphery; and
   control means operatively connecting said machine and said drive means for operating said ram only upon production of said scraps by said machine and induction of said scraps into said chamber by said suction means.

2. The apparatus defined in claim 1, further comprising means for operating said suction means in step with the operation of said machine, said control means operating said ram only during intervals between operations of said suction means.

3. The apparatus defined in claim 1, further comprising temperature-control means for automatically regulating said heating means to thermally fuse only scrap along the periphery of said strand to form a continuous sheath around the compacted scrap in the interior of the strand.

4. The apparatus defined in claim 1 wherein said suction means includes a perforated wall in said chamber and means for continuously aspirating air from behind said perforated wall.

* * * * *